United States Patent
Godshall et al.

(10) Patent No.: US 8,444,829 B2
(45) Date of Patent: May 21, 2013

(54) SYSTEMS, PROCESSES AND METHODOLOGIES FOR PRODUCING CLEAN WATER

(75) Inventors: Ned Allen Godshall, Albuquerque, NM (US); Matthew Jason Bruff, Englewood, CO (US)

(73) Assignee: Altela, Inc., Albuequerque, NM (US)

( * ) Notice: Subject to any disclaimer, the term of this patent is extended or adjusted under 35 U.S.C. 154(b) by 889 days.

(21) Appl. No.: 11/859,731

(22) Filed: Sep. 21, 2007

(65) Prior Publication Data

US 2008/0073200 A1   Mar. 27, 2008

Related U.S. Application Data

(60) Provisional application No. 60/826,730, filed on Sep. 22, 2006.

(51) Int. Cl.
*B01D 3/34* (2006.01)
*C02F 1/04* (2006.01)

(52) U.S. Cl.
USPC ........ 203/10; 203/6; 203/25; 203/49; 203/86; 203/DIG. 8; 210/696; 210/774; 261/128

(58) Field of Classification Search
USPC . 203/6, 10, 25, 49, 86, 100, DIG. 8; 210/696, 210/774; 261/128
See application file for complete search history.

(56) References Cited

U.S. PATENT DOCUMENTS

| 4,627,922 | A | 12/1986 | Viator et al. |
| 6,699,369 | B1 | 3/2004 | Hartman et al. |
| 6,875,351 | B2 | 4/2005 | Arnaud |
| 7,067,044 | B1 * | 6/2006 | Coon .............................. 203/10 |
| 7,225,620 | B2 * | 6/2007 | Klausner et al. ............. 60/641.1 |
| 7,374,668 | B1 * | 5/2008 | DiValentin et al. ........... 210/106 |
| 7,431,805 | B2 * | 10/2008 | Beckman ......................... 203/2 |

OTHER PUBLICATIONS

International Search Report, Feb. 12, 2008, Korean IPO.
International Preliminary Report on Patentability; Written Opinion of the International Searching Authority (Feb. 12, 2008).

* cited by examiner

*Primary Examiner* — Virginia Manoharan
(74) *Attorney, Agent, or Firm* — Baker & Hostetler, LLP; Peter J. Gluck; Mark H. Krietzman

(57) ABSTRACT

Improved methods for carrier-gas humidification/dehumidification [HDH] or dewvaporization enable production of clean water, derived in part from models generated and tested with produced water from the oil and gas industries, which likewise address industrial waste water remediation and generally facilitate the time and cost efficient disposal of waste waters from a plurality of industries ranging from food, wine, and beverage production to novel enhanced efficiencies within the oil and gas industries themselves. High efficiency carrier gas HDH thermal distillation functions without membranes, at ambient or near ambient pressures with no required pre- or post-treatment, and economies of scale to leverage a plastics-based processing platform. Industrial waste water including that generated by the food, wine, and beverage industries, among others, is likewise ameliorated according to the instant teachings.

4 Claims, No Drawings

SYSTEMS, PROCESSES AND METHODOLOGIES FOR PRODUCING CLEAN WATER

CROSS-REFERENCE TO RELATED APPLICATIONS

This application claims full Paris Convention and related priority rights from U.S. Provisional Ser. No. 60/826,730 filed Sep. 22, 2006, filed by the present inventors, and said document is expressly incorporated herein by reference as if fully set forth herein.

BACKGROUND OF THE DISCLOSURE

1. Field of the Disclosure

The present disclosure relates to water cleaning systems and methods for field testing and creating value based on using lower aliquots of energy than currently employed to produce clean water. The present disclosure specifically provides a series of technical system improvements based on an improved technical model to exploit exclusively licensed technology for generating cleaned waters from industry, but are not limited to the oil and gas industry, mining, pulp and paper, semiconductor, food and beverage, chemical plating, as well as municipal waste water treatment, electric power generation, environmental remediation, and the generation of clean water for human, animal and agricultural uses.

Existing systems for producing clean water do not support the ongoing needs of the populations of the world for several prominent reasons, as well documented in the literature. The present inventors have studied these issues and are obtaining the first-ever permit for surface discharge of produced water in New Mexico.

Industries ranging from those charged with creating potable water to industrial power generators have evidenced longstanding needs in this area. Prior to the advent of the instant teachings these needs remained unaddressed.

2. Background of the Art

Produced water is water trapped in underground formations which comes to the surface during oil and gas exploration and production. It occurs naturally in formations where oil and gas are found along with the oil and gas, which is millions of years old. When oil or gas is produced, both are brought to the surface as a produced fluid.

The composition of this produced fluid includes a mixture of either liquid or gaseous hydrocarbons, produced water, dissolved or suspended solids, produced solids such as sand or silt, and recently injected fluids and additives that may have been placed in the formation as a result of exploration and production activities. Studies indicate that the produced waters associated with gas/condensate platforms are approximately ten times more toxic than the produced waters discharged from traditional oil platforms.

Production of coal bed methane (CBM) often involves significant amounts of produced water. CBM operators typically drill surface wells into coal seams. These coal seams usually contain deep bedrock aquifers and large volumes of water. CBM operators pump this water from the seam causing a reduction in pressure, thereby releasing methane to the surface with the formation (produced) water. Produced water nearly always contains salt, and is therefore brackish or saline water.

The American Petroleum Institute (API) defines produced water as "the saline water brought to the surface with oil and gas." U.S. Environmental Protection Agency (EPA) guidelines define produced water as "water (brine) brought up from the hydrocarbon-bearing strata during the extraction of oil and gas, and can include formation water, injection water, and any chemical added downhole or during the oil/water separation process."

In general, neither the amount of produced water nor the quality of the water can be predicted prior to bringing the water to the surface. Produced water indicators vary across, and even within formation basins, depending on the depth of the well, geology, and environment of the deposit. In addition, formation hydrology often causes the quality of the produced water to change intermittently as the production well ages.

The volume of produced water from oil and gas wells also does not remain constant with time. Traditionally, the water-to-oil ratio is the lowest when the well is new. As the well ages, the water-to-oil ratio increases, while the percentage of oil and gas similarly declines. For crude oil wells approaching the end of their production and/or economic life, produced water can comprise as much as 98% of the fluids pumped. CBM wells, by contrast, typically generate the most produced water early in the life of the well, with the water quantity declining as the well ages. In both cases however, for both oil and gas, the well's economic life is usually dictated by the amount of water produced—and its cost of disposal—rather than by the true end of oil or gas underground at the well. That is, by reducing the cost of produced water disposal, the economic reserves of oil and gas are increased in the U.S.

Produced water is by far the largest volume of waste generated in oil and gas extraction operations. Typically, in the United States 7 to 10 barrels of produced water are pumped for each barrel of oil produced. It is estimated that the United States oil and gas industry generates 20 to 30 billion barrels of produced water every year. This is equivalent to one-fifth of the entire flow of the Colorado River. Produced water streams are usually separated from the oil and gas at the wellhead and must be disposed of in a manner appropriate for the protection of human health and the environment.

In the United States, produced water comprises approximately 80% of the total volume of oil and gas production and exploration waste generated by the oil and gas industry. In the natural gas industry, more than 60% of the produced water generated is currently re-injected back into the ground. This percentage rises to 90% when traditional oil and gas produced water volume is considered. While re-injection wells are currently an approved regulatory disposal method, certain Rocky Mountain states are already experiencing limited re-injection capabilities as more stringent environmental regulations develop. Increasingly, alternative produced water disposal and treatment methods are needed.

In short, the known processes to produce cleaned water have not been efficient enough to satisfy the longstanding need to recover either potable or useful water without use of extreme conditions and significant energy inputs prior to the advent of the instant teachings, which address and overcome said longstanding need.

SUMMARY OF THE DISCLOSURE

Briefly stated, there are described new systems, processes and methodologies for use of AltelaRain® (available from Altela, Inc. of Albuquerque, N. Mex. 87106 and Englewood, Colo. 80111) based processes (carrier-gas humidification/dehumidification HDH or dewvaporization) which enable production of clean water, derived in part from models generated and tested with produced water from the oil and gas industries. The instant disclosure likewise addresses industrial waste water remediation and generally facilitates the time and cost and efficient disposal of waste waters from a plurality of industries ranging from food and wine production to novel enhanced efficiencies within the oil and gas industries themselves. High efficiency carrier gas HDH thermal distillation functions without membranes, at ambient or near ambient pressures with no required pre- or post-treatment, and economies of scale to leverage a plastics or polymer material platform. Industrial waste water including that generated by the food wine, and beverage industries, is likewise ameliorated according to the instant teachings.

According to a feature of the present disclosure there is provided an improved method for producing clean water from contaminated water, which comprises, in combination, addressing a market having water management issues, constraints or needs, providing services relating to at least one of produced water treatment, regulatory permitting, disposal solutions for natural gas and oil and mineral industries, desalination, food, wine and beverage industries and other industrial waste remediation, inter alia mimicking a natural rain cycle with an AltelaRain$^{SM}$ technology process, for producing cleaner water, resultory data relating to the same, and industrial efficiencies in that the energy required is less than at least about one-half of that used in known ambient pressure thermal distillation processes to create cleaned water from contaminated water.

According to another feature of the present disclosure there is provided an enhanced method for using a carrier-gas humidification/dehumidification process, comprising in combination, providing a system to remove salts, residual oils and other contaminants from water for installation and operation as water clean-up technology, which system is capable of operation 24 hours a day and 7 days-a-week, operating the system at a lower cost than traditional produced water methods and other industrial waste remediation methods, producing purified water useful as fractionation stimulation material, among other things, and, enabling on-site usage of the resulting water thereby eliminating transport and off-site disposal costs for the resulting water.

According to embodiments of the disclosure, there is provided a heat transfer wall having an evaporation side and a dew-formation side which is continuously contacting the liquid mixture with the evaporation side of the heat transfer wall. Another feature of the present disclosure is flowing a carrier gas across the evaporation side of the heat transfer wall to provide a carrier gas saturated with the separable liquid component; along with heating the saturated carrier gas and flowing the heated saturated carrier gas across the dew-formation side of the heat transfer wall to provide condensation of the separable liquid component from the heated saturated carrier gas. The improvement which comprises capturing the heat of condensation for reuse in the evaporation cycle, whereby the process is operated at lower cost then traditional procedure water methods.

According to embodiments, there is provided a process using a continuous contacting apparatus for separating a liquid component from a liquid mixture, comprising in combination, providing a heat transfer wall having an evaporation side and a dew-formation side with a continuous contacting the liquid mixture with the evaporation side of the heat transfer wall which is flowing a carrier gas across the evaporation side of the heat transfer wall to provide a carrier gas saturated with the separable liquid component and heating the saturated carrier gas and flowing the heated saturated carrier gas across the dew-formation side of the heat transfer wall to provide condensation of the separable liquid component from the heated saturated carrier gas; whereby the process of the improvement which comprises capturing the heat of condensation for reuse in the evaporation cycle, whereby the process is operated at lower cost then traditional procedure water methods.

DETAILED DESCRIPTION OF THE DISCLOSURE

U.S. Pat. No. 6,911,121 and—each of which is expressly incorporated herein by reference, as if fully set forth herein, and exclusively licensed to the instant assignee, enables significant returns on investment by addressing and attacking water treatment according to the instant method set and processes that leverage off of nature's teachings in evaporating sea water which then is converted into rain by the forces of weather. While capturing the heat of condensation for reuse in the evaporation cycle. This is done with such a reduced amount of energy that it can solve the problem of desalination which currently plagues the world and remains too costly for many.

Microfiltration (MF), ultrafiltration (UF), nanofiltration (NF) and reverse osmosis (RO) have been employed for the treatment of produced water and represent the most common techniques attempted for produced water purification. In particular, these hyperfiltration technologies have been utilized as a means of achieving brine reduction for low-TDS CBM produced water as well as conventional gas well produced water. Each utilizes high pressure across the membranes to accomplish filtration of contaminants from the produced water, concentrating it into a reject stream that then requires disposal.

MF, UF and NF reject contaminates larger than the pore size of the membrane whereas RO uses an operating pressure higher than the osmotic pressure of the salt present in the water to drive pure water through the membrane, thereby rejecting most of the salts. The rate of flow of pure water through the membrane is dependant upon the salt concentration, temperature of the water and the net driving pressure (provided by a high pressure pump).

At higher pressures, the permeate quality improves due to a greater increase in water flux than the increase in solute flux. The physical strength of the membrane and support material limits the practical maximum operating pressure. All membrane techniques require high amounts of electricity that are often not present at many wellsites.

In gas-liquid separation, the pressure difference across a selective membrane deals with pore size of approximately 0.03 micrometers (30 nm). Gas penetrates into the membrane at a rate based on diffusivity and solubility of molecules to attain the equilibrium between the gas phase and the solute gas in liquid. The pressure difference is a result of vacuum or gas sweep through the membrane.

Recently, there have been many new membrane technologies applied to produced water treatment. Osmonics, Inc. has developed a spiral wound membrane. These spiral wound membranes were advertised to offer the most efficient packing of membrane area to provide higher membrane contact area in a very limited space. The performance of these membranes is reduced by higher temperatures—optimum temperature is between 113-122° F.

Higher temperatures up to 194° F. can be used but requires more energy to achieve the desired separation. Ionics, Inc. has developed a HERO membrane to provide higher water recovery, higher quality permeate and higher operating flux than conventional RO treatment. Yet the HERO membrane still requires pretreatment of the feed water prior to RO operation to raise the pH of the feed water to obtain optimum efficiency by removing boron and reducing membrane fouling.

The PRRC of New Mexico Institute of Mining and Technology has developed inorganic membranes for use with produced water treatment of greater than 50,000 ppm in the San Juan Basin, as well as greater than 100,000 ppm in the Permian basin. These inorganic membranes are made up of zeolite and provide higher flux, pH compatibility and both thermal and chemical stability. Finally, New Logic Research, Inc. has created a vibrating membrane (VSEP) to address fouling and scaling of the membranes. Continual and incremental improvements in membrane design will likely continue; however membrane technologies have not overcome the costly pre-treatment processes required for complete produced water purification.

The ion exchange process effectively removes arsenic, heavy metals, nitrates, radium, salts, uranium, and other elements from produced water. Ion-exchange is a rapid and reversible process in which impurity ions present in the water are replaced by ions released by an ion-exchange resin. The impurity ions are taken up by the resin, which must be periodically regenerated to restore it to the original ionic form. (An ion is an atom or group of atoms with an electric charge. Positively-charged ions are called cations and are usually metals; negatively-charged ions are called anions.)

Electrodialysis (ED) is an electrically-driven process, traditionally operating at very low pressure drops of approximately 25 pounds per square inch (psi) across the process. This compares with the typical pressure drop across an RO platform of between 400-1,400 psi which translates into higher energy consumption and operating costs. Electrodialysis reduces salinity by transferring ions from feed-water compartments, through membranes, under the influence of an electrical potential difference.

The positively and negatively charged ions of the dissolved salts in saline feed-water will move towards oppositely charged electrodes immersed in the solution. An electrodialysis 'stack' consists of multiple pairs of membranes between two electrodes with a spacer assembly between each pair to collect the dilute and concentrated solutions. The electrodialysis reversal system (EDR) reverses the polarity periodically. Therefore each flow channel has low-salinity dilute streams washing away any scale left by the high-salinity stream of the other polarity.

Capacitive deionization technology is similar to ED, except that no membranes are employed. Capacitive deionization is centered about a multi layer capacitor often referred to as a flow-through capacitor (FTC). The following summary of FTC technology was taken largely from the Biosource Inc. technology description. Biosource has developed and has shown the potential of this engineered technology. (Sandia National Laboratories has further investigated the promise of this technology, in the laboratory, with a Biosource demonstration unit.)

The FTC deionization is simply a capacitor of the electric double layer type designed to provide a flow path for water. Due to the capacitance, a very strong field gradient exists right at the conductive surface. The ionic contaminants are pulled perpendicular to the flow path, down into the electrodes presently made of carbon. Upon applying a DC voltage, ionic contaminants electrostatically adsorb to the conductive high surface area carbon, with an equivalent amount of electronic charge. The flow-through capacitor is regenerated by short circuiting its leads through a load and reversing the voltage. This neutralizes and then reverses the charge, repelling the absorbed contaminants into a concentrated waste stream.

The ability to turn the surface charge off electronically allows for chemical free regeneration. To prevent fouling, the polarity of the FTC electrodes can be reversed every charge cycle. This tends to drive off foulants that might tend to favorably attract on one polarity electrode. The FTC holds a charge and stores energy when disconnected from the power source, just like an ordinary capacitor. Simultaneously, stored energy is released as DC current. The electronic charge of the FTC is not fixed. It can be turned on and off, or modulated electronically.

Freeze-Thaw Evaporation (FTE) relies on nature's freezing and evaporation cycles. The principle behind freeze-thaw is based on the fact that salts dissolved in water lower the freezing point of the solution below 32° F. Partial freezing occurs when the solution is cooled below 32° F., but held above the depressed freezing point of the solution. In that range, relatively pure ice crystals form, and an unfrozen brine solution containing elevated concentrations of the dissolved salts can be drained away from the ice. When the ice melts, it is essentially pure water. The produced water is frozen by spraying onto a lined pond (freezing pad) when winter temperatures reach the appropriate level. The concentrated brine is drained from the pad during the freezing cycle, and the purified melt water is collected during the thaw cycle.

The present inventors have discovered novel methods including processes to use natural gas to boil water (our own distilled water (DW)) in a conventional boiler to make ambient pressure steam. The calculation is based on straightforward engineering considerations of the conversion of gas to heat energy (expressed in BTUs) and the known heat capacity of water and the latent heat of evaporation inherent in the water-to-vapor phase change for water (approximately—1,050 BTUs/pound of water).

Dewvaporation, as discussed, represents a simple solution to removing all produced water contaminants, even in highly-challenged and extremely high-TDS conditions. Like all distillation based processes, the water generated on the condensation side of the heat exchanger is pure and contains no dissolved or suspended solids. The vapor phase water is also free of chemical compounds which have boiling points greater than or equal to that of water (at atmospheric conditions). As a thermal process, the vapor then re-condenses in the form of a very high-purity effluent stream. Like most thermal processes, water chemistry has only mild effects on system performance. Finally, recent testing of the technology has revealed that highly volatile components, for example, Benzene, Toluene, Ethylbenzene, and Xylenes (BTEX) compounds typically found in produced waters do not re-condense in the distillate stream, making the process by far the highest quality water of those technologies evaluated, likewise including rapid spray, packed-bed absorption, and constructed wetlands.

Another major advantage of thermal processes is their inherent flexibility and modularity. The dewvaporation process is no different in this regard. The low cost, scale-resistant materials used to fabricate dewvaporation towers enable treatment systems to be built that are both modular and mobile, easily maintained, and capable of processing water with highly variable influent compositions. The modular design of a dewvaporation based system enables installers to customize each treatment system with little or no additional cost to customers. For example, a dewvaporation system can be installed to minimize the effluent brine reject stream simply by re-configuring the physical layout of the primary system towers into differing series/parallel configurations.

Like other thermal processes, dewvaporation is simple, easy to maintain, and can operate unattended for long periods of time. However, unlike other desalination methods the primary treatment components are fabricated entirely from plastic. This eliminates the need for costly influent pretreatment components (such as filters, flocculants, and anti-sealant additives). This technology is unique, in that no metal is present for which corrosion and scaling can exist.

Also, similar to other thermal processes the major operating expense is the energy required to evaporate the influent water. However, dewvaporation has another inherent advantage in that the process operates at low temperatures, typically 180° F. or less. This makes it possible for a dewvaporation based produced water treatment systems to use low grade sources of waste heat. Such operating scenarios dramatically increase the operating efficiency by further reducing the operating costs by virtue of the technique's unique ability to 're-use' this low-grade heat multiple times by applying the exothermic heat of condensation (dew formation) to the endothermic heat of evaporation in a continual loop process.

According to prevailing thought, dewvaporation based treatment systems typically require more physical space to treat a given volume of water than comparable RO systems (without taking into account other variables). This is a function of the low thermal conductivity of plastics relative to that of metal. This is generally a minor consideration since wellsites are located remotely with ample land available for the system's installation. Furthermore, many low cost construction techniques can be employed to erect temporary or permanent structures. Operation noise is minimal.

The Dewvaporation technology is also able to be scaled down small enough to operate at individual wellsites. A typical well generating only 10-20 barrels per day (BPD) of produced water is not practical for high throughput technologies such as RO or other membrane technologies. The AltelaRain® product treats 1,000 gallons per day, which is equivalent to 24 BPD—ideal for typical oil and gas wellsites in New Mexico.

The only two variables in the equation then are (i) the all-important Energy Reuse Factor, f, inherent in our AltelaRain® towers and (ii) the cost of natural gas, $C_{NG}$, at our treatment locations (expressed in dollars per million BTUs—$/MBTUs'):

Energy

The amount of steam energy required to make 1 gallon of clean DW is a function only of f (ignoring the effect of salinity), and is given by:

1 gal DW×1/f[gal DW/gal $BW$]×8.345 lbs steam/gal $BW$×1,050 BTUs/lbs steam=BTU's/gallon DW Or, BTU's/gallon DW=8,762/f At f=1, without the AltelaRain® process, it therefore theoretically [and about 11,700 BTU's/gallon in real-world applications] of water to boil clean water (and even more to boil salt water)—or 368,000 BTU's/bbl (0.368 MBTU's/bbl). However, at f=3.0, with the AltelaRain$^{SM}$ process, it therefore only takes 2,921 BTU's/gallon of water to boil clean water— or 122,670 BTU's/bbl (0.123 MBTU's/bbl).

Cost

The theoretical (minimum) energy cost of making 1 gallon of clean DW is given by:

1 gal DW×1/f[gal DW/gal $BW$]×8.345 lbs steam/gal $BW$×1,050 BTUs/lbs steam×CNG[$/MBTUs]×(1 M/1,000,000)×1,000=$/1,000 gallons DW Or, $/1,000 gallons=CNG×8.762/f At f=1, without the AltelaRain® process, it therefore takes theoretically 8,762 BTU's/gallon [about 11,700 BTU's/gallon in real-world applications] of water to boil clean water (and even more to boil salt water)—or 368,000 BTU's/bbl (0.368 MBTU's/bbl.)

That is, the theoretical cost of natural gas to make 1,000 gallons of DW in our operations, when we have to pay for the gas, is inversely proportional to f, and linear with the cost of gas, CNG, multiplied by 8.762. As an example, if we were to pay $2.50/MBTU ($2.50/MCF) at wholesale prices (before transportation of the gas to retail markets) at a well site, and our towers were operating at an f=3.0—then our energy cost would be $7.30/1,000 gallons of clean water that we produced. Although this cost is about 2 times higher than the price of typical municipal drinking water in the U.S., this figure is quite low for the elimination or remediation of industrial contaminated water liability. It is also considerably lower than the cost of simply boiling the water—which would be $43.80/1,000 gallons, just for the energy, at present retail gas prices (~$5.00/MBTU).

Similarly, on a per-barrel basis, the cost of our main energy source is:

$/barrel=CNG×0.37/f

That is, the cost of natural gas to make one barrel of DW in our operations, when we have to pay for the gas, is inversely proportional to f, and linear with the cost of gas, $C_{NG}$, multiplied by 0.37. As an example, if we were to pay $2.50 MBTU (~$2.50/MCF) at wholesale prices (one half of retail, before transportation of the gas to retail markets) at a well site, and our towers were operating at an f=3.0—then our energy cost would be ~$0.30/barrel of clean water that we produced. Although this cost is about 2 times higher than the price of typical municipal drinking water in the U.S., this figure is only 7% of the cost that producers are currently paying to get rid of their PW liability, if they are paying $4.40/bbl presently.

Furthermore, a quick "sensitivity analysis" illustrates that at these higher PW liability prices—especially those above $5 or $6 per barrel—an improvement in our ERF, f factor, is not that critical. For example, at a price point of $6 per barrel, our natural gas operating cost of $0.30/barrel above would only be 5% of the operator's present cost—and furthermore would drop to only 4% of the operator's present cost if we increased our f from 3.0 to, say, 4.0—or $0.23/barrel for the gas.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A process of separating a liquid component from a liquid mixture using a continuous contacting apparatus, the process consisting essentially of:
providing a heat transfer wall having an evaporation side and a dew-formation side;
continuously contacting the liquid mixture with the evaporation side of the heat transfer wall;
flowing a carrier gas across the evaporation side of the heat transfer wall to provide a carrier gas saturated with the separable liquid component;
heating the saturated carrier gas;

flowing the heated saturated carrier gas across the dew-formation side of the heat transfer wall to provide condensation of the separable liquid component from the heated saturated carrier gas;

the heat of condensation being captured for reuse in the evaporation cycle, wherein the flow of the carrier gas across the evaporation side of the heat transfer wall is countercurrent to the flow of the carrier gas across the dew-formation side of the heat transfer wall;

wherein the evaporation side of the that transfer wall further comprises a wetting material placed on the wall;

wherein the saturated gas is heated by a method selected from the group consisting of adding steam; gas-liquid contacting with a hot water stream; heat exchanging with a slip carrier gas stream that is brought into contact with a desiccant; and reacting the carrier gas with a reactant;

wherein primary treatment components of the apparatus are fabricated from plastic; and, further comprising adding an anti-gellant or an anti-flocculant to said liquid mixture before contacting the liquid mixture with the evaporation side of the heat transfer wall.

2. The process of claim 1, wherein the saturated carrier gas is heated to a temperature of 180 degrees F. or less.

3. The process of claim 1, wherein the heating of the saturated carrier gas is by using waste heat.

4. The process of claim 1, wherein the heating of the saturated carrier gas is by using natural gas.

* * * * *